United States Patent

[11] 3,585,515

[72] Inventors Joseph A. Riess
Dayton;
Conrad P. Vespie, Brookville, both of, Ohio
[21] Appl. No. 780,092
[22] Filed Nov. 29, 1968
[45] Patented June 15, 1971
[73] Assignee General Motors Corporation
Detroit, Mich.

[54] CIRCUIT FOR PRODUCING AN OUTPUT SIGNAL WHICH VARIES INVERSELY WITH THE MAGNITUDE OF AN INPUT SIGNAL
2 Claims, 3 Drawing Figs.

[52] U.S. Cl. .................................................. 330/20, 330/30
[51] Int. Cl. .................................................. H03f 3/68
[50] Field of Search .................................................. 330/20, 30, 30 D

[56] References Cited
UNITED STATES PATENTS
3,355,671 11/1967 Brewster ..................... 330/30
3,443,213 5/1969 Bader et al. ........ 330/20 UX
OTHER REFERENCES
ELECTRONIC ENGINEERING, April 1966, pp. 252, 253 330— 30D

*Primary Examiner*—Roy Lake
*Assistant Examiner*—James B. Mullins
*Attorneys*—W E. Finken and Richard G. Stahr

ABSTRACT: A circuit for producing an output signal which varies inversely with the magnitude of an input signal. The base drive circuit of an output transistor, which produces an output signal across associated output circuit terminals of a magnitude proportional to the degree of conduction through the current carrying electrodes thereof, is established across a direct current potential source through the current carrying electrodes of a first control transistor, base biased for class A operation, and a series connected control transistor emitter resistor. The input signal is applied across the base-emitter electrodes of a second control transistor, also base biased for class A operation, the collector-emitter electrodes of which are connected across the direct current potential source through the emitter resistor of the first control transistor.

INVENTORS
Joseph A. Riess, &
BY Conrad P. Vespie
Richard G. Stahr
ATTORNEY

INVENTORS
Joseph A. Riess, &
Conrad P. Vespie
BY
Richard G. Stahr
ATTORNEY

CIRCUIT FOR PRODUCING AN OUTPUT SIGNAL WHICH VARIES INVERSELY WITH THE MAGNITUDE OF AN INPUT SIGNAL

This invention is directed to a circuit for producing an output signal which varies inversely with the magnitude of an input signal.

With certain applications, it may be desirable to produce a signal which varies substantially for and inversely with the magnitude of another signal.

It is, therefore, an object of this invention to provide an improved circuit for producing an output signal which varies inversely with the magnitude of an input signal.

In accordance with this invention, a circuit for producing an output signal which varies inversely with the magnitude of an input signal is provided wherein the degree of conduction through the base drive circuit and, consequently, the degree of conduction through the current carrying electrodes of an output transistor are controlled by the degree of conduction through the collector-emitter electrodes of a first control transistor which is, in turn, determined by the degree of conduction through the collector-emitter electrodes of a second control transistor across the base-emitter electrodes of which the input signal is applied.

Figure 1:
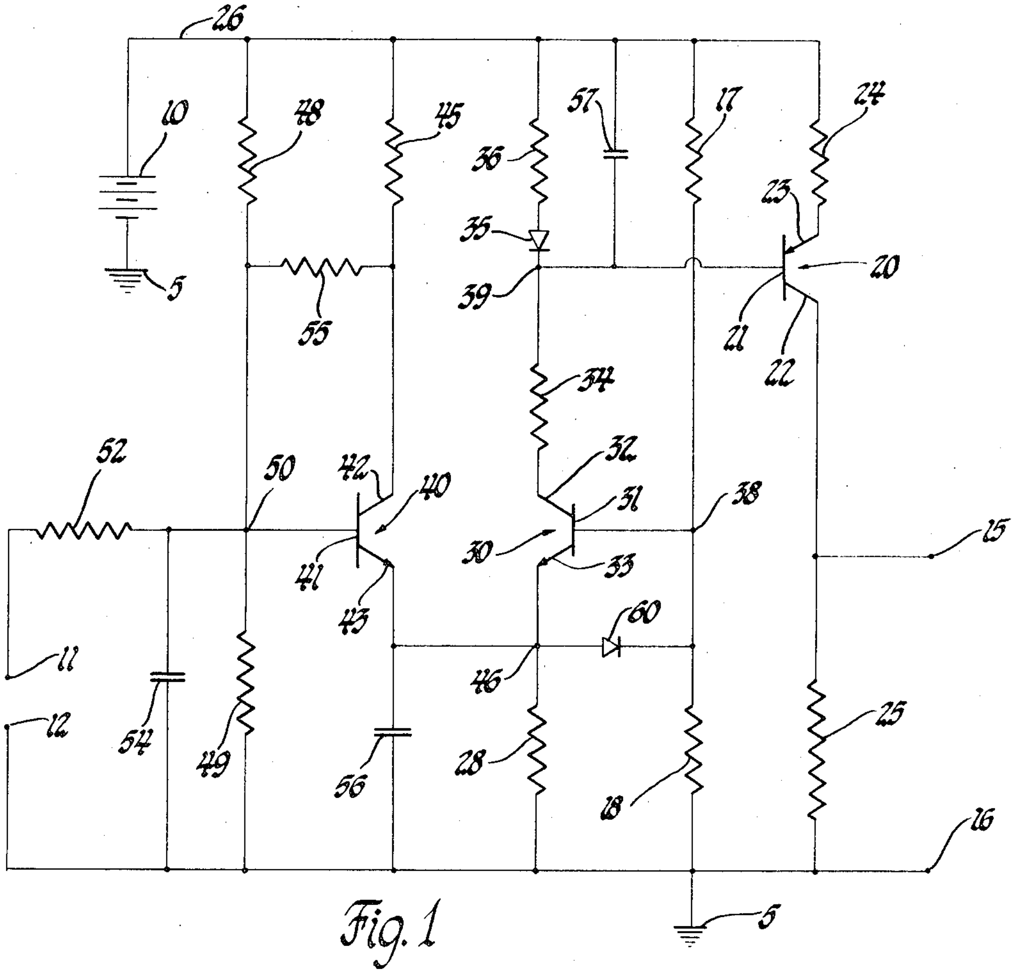
Figure 3:
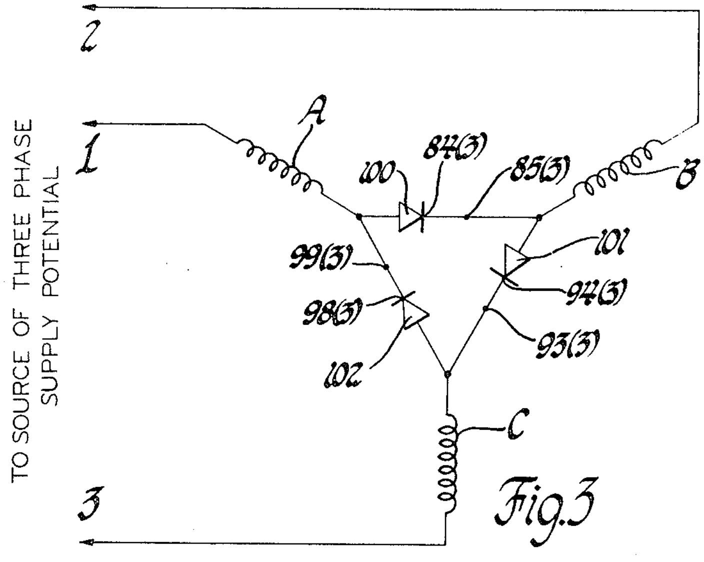
Figure 2:
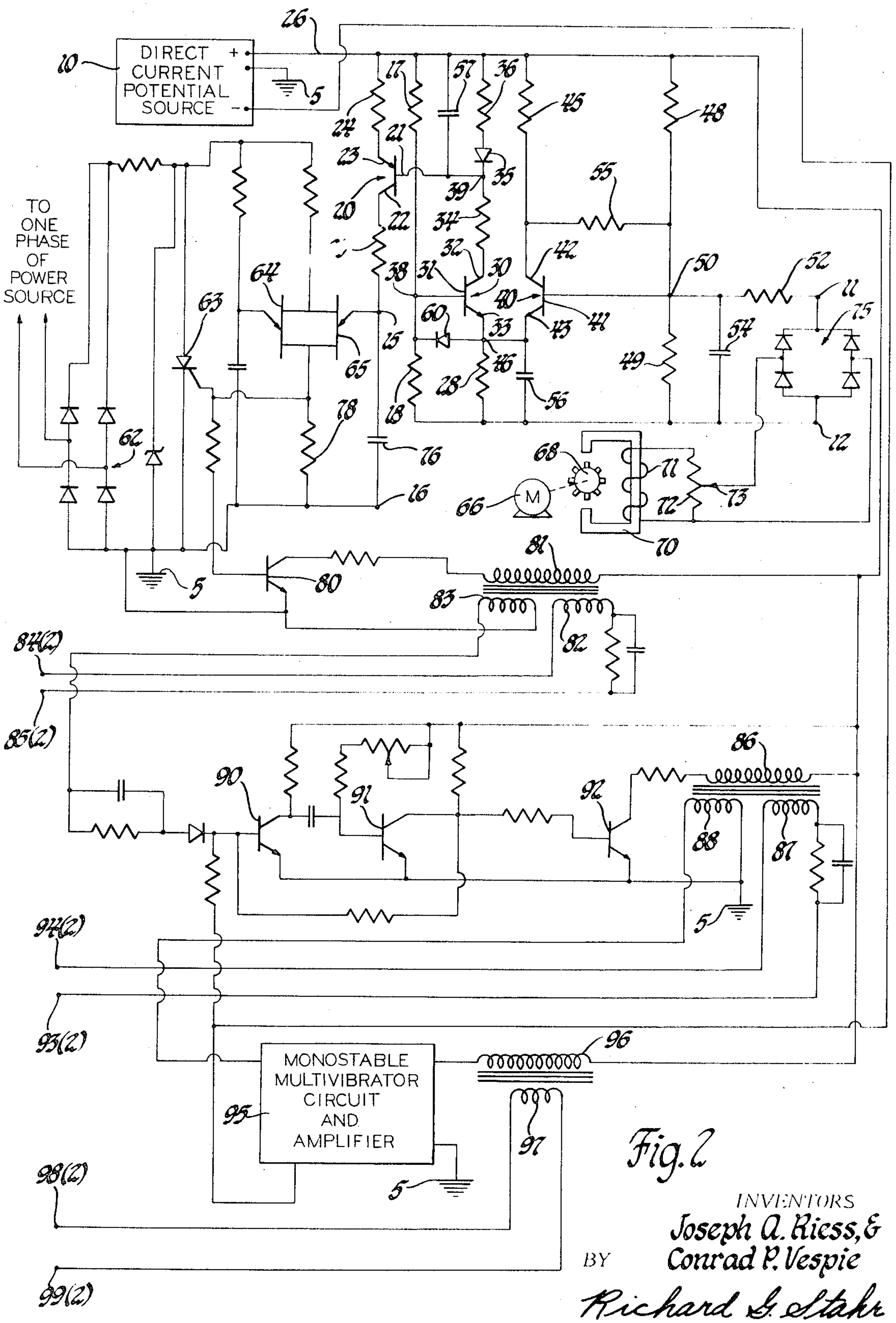

For a better understanding of the present invention together with additional objects, advantages and features thereof, reference is made to the following description and accompanying drawings in which:

FIG. 1 is a schematic diagram of the circuit of this invention for producing an output signal which varies inversely with the magnitude of an input signal, FIG. 2 illustrates a practical application of the circuit of this invention when employed as a speed control and sensing circuit in an alternating current induction motor speed control system and, FIG. 3 illustrates one method of connecting the phase windings of a three phase alternating current induction motor across a source of three phase supply potential in response to trigger signals produced by the circuit of FIG. 2.

As point of reference or ground potential is the same point electrically, it has been illustrated by the accepted schematic symbol and referenced by the numeral 5 throughout the FIGS.

In FIG. 1 of the drawing, the circuit of this invention for producing an output signal which varies inversely with the magnitude of an input signal is schematically set forth in combination with a source of direct current potential having positive and negative polarity terminals which may be a battery 10 or any other convenient source of direct current potential.

The input circuitry, across which an externally generated input signal may be applied, may be terminals 11 and 12 or any other electrical device suitable for providing an electrical connection to external circuitry and the output circuitry also may be terminals 15 and 16 or any other electrical device suitable for providing an electrical connection to external utilization circuitry.

To produce an output signal across output circuit terminals 15 and 16 of a magnitude which is inversely proportional to the magnitude of an input signal applied across input circuit terminals 11 and 12, an output transistor 20 having a base electrode 21 and two current carrying electrodes, collector electrode 22 and emitter electrode 23, connected across source of direct current potential 10 and poled for forward conduction therethrough is provided.

The output transistor 20 base drive circuit, through which base electrode 21 and one of the current carrying electrodes thereof are connected across source of direct current potential 10 in the polarity relationship which will produce base drive current through output transistor 20, includes circuitry responsive to an input signal applied across input circuit terminals 11 and 12 for varying the magnitude of base drive current through output transistor 20 inversely with the magnitude of the input signal.

The circuitry included in the base drive circuit of output transistor 20 which is responsive to an input signal applied across input terminals 11 and 12 for varying the magnitude of the base drive current through output transistor 20 may be a control transistor 30 having a base electrode 31 and two current carrying electrodes, collector electrode 32 and emitter electrode 33, connected across source of direct current potential 10 and poled for forward conduction therethrough. The base electrode 21 of output transistor 20 is connected to the polarity terminal of source of direct current potential 10 which will produce base drive current therefor through the current carrying electrodes of control transistor 30.

A base bias circuit, comprising series resistors 17 and 18, for control transistor 30 is interconnected with the source of direct current potential 10 and the base electrode 31 of control transistor 30 for producing base drive current through control transistor 30 whereby control transistor 30 is normally conducting in a class A operation.

To vary the degree of conduction through the current carrying electrodes of control transistor 30 inversely with the magnitude of an input signal applied across input terminals 11 and 12, another control transistor 40 having a base electrode 41 and two current carrying electrodes, collector electrode 42 and emitter electrode 43, which is responsive to an input signal applied across input circuit terminals 11 and 12 is provided.

The output circuit, terminals 15 and 16, are interconnected with the current carrying electrodes of output transistor 20 in such a manner that the signal produced upon conduction therethrough may be taken therefrom and applied to external utilization circuitry.

In FIG. 1, output transistor 20 is set forth as a type PNP transistor having the emitter electrode 23 connected to the positive polarity terminal of source of direct current potential 10 through resistor 24 and lead 26 and the collector electrode 22 connected to the negative polarity terminal of source of direct current potential 10 through collector resistor 25 and point of reference or ground potential 5. Therefore, the current carrying electrodes, emitter electrode 23 and collector electrode 22, of this type PNP output transistor are connected across source of direct current potential 10 in the correct polarity relationship for forward conduction therethrough.

To complete a base drive circuit for type PNP output transistor 20, through which emitter electrode 23 and base electrode 21 are connected across source of direct current potential 10 in the correct polarity relationship to produce base drive current through transistor 20, base electrode 21 is connected to the negative polarity terminal of source of direct current potential 10 through junction 39 between resistors 34 and 36, the current carrying electrodes of control transistor 30 and emitter resistor 28.

FIG. 1, output terminals 15 and 16 are shown to be connected across collector resistor 25, however, any other arrangement may be employed such as placing collector resistor 25 in series with output terminals 15 and 16 and an external circuit element, as is shown in FIG. 2.

The collector electrode 32 of type NPN control transistor 30 is connected to the positive polarity terminal of source of direct current potential 10 through the series combination of resistor 34, diode 35, resistor 36 and lead 26 and the emitter electrode 33 is connected to the negative polarity terminal of source of direct current potential 10 through emitter resistor 28 and point of reference or ground potential 5. Therefore, the collector-emitter electrode of type NPN control transistor 30 are poled for forward conduction therethrough.

Resistors 17 and 18 are connected in series across source of direct current potential 10 through lead 26 and point of reference or ground potential 5 to provide a base electrode bias circuit for control transistor 30, the base electrode 31 of which is connected to junction 38 between resistors 17 and 18, for establishing a substantially constant potential across base electrode 31 and emitter electrode 33 of control transistor 30. Resistor 18 of this base bias circuit is selected to be of an ohmic value which will provide for control transistor 30 to be normally conducting in class A operation.

The current carrying electrodes, collector electrode 42 and emitter electrode 43, of type NPN control transistor 40 and emitter resistor 28 are connected in series across source of direct current potential 10 with collector electrode 42 being connected to the positive polarity terminal of source of direct current potential 10 through resistor 45 and emitter electrode 43 being connected to the negative polarity terminal of source of direct current potential 10 through junction 46, between the emitter electrode 33 of control transistor 30 and emitter resistor 28, emitter resistor 28 and point of reference or ground potential 5. Therefore, the collector-emitter electrodes of this type NPN transistor are poled for forward conduction.

To operate control transistor 40 normally conducting, resistors 48 and 49 are connected in series across source of direct current potential source 10, through lead 26 and point of reference or ground potential 5 with the base electrode 41 of control transistor 40 connected to junction 50 therebetween.

Input terminal 11 is connected to the base electrode 41 of control transistor 40 through resistor 52 and junction 50 while input terminal 12 is connected to the emitter electrode 43 of control transistor 40 through point of reference or ground potential 5 and emitter resistor 28.

Resistor 52 and capacitor 54 provide a filter circuit for smoothing the input signal, resistor 55 connected across base 41 and collector 42 of control transistor 40 is included for the purpose of stabilizing the operation of control transistor 40, diode 35 is included to provide temperature compensation for output transistor 20 and capacitors 56 and 57 are by-pass capacitors. Diode 60 is provided for the purpose of protecting the base-emitter junction of control transistor 30 in the event transistor 40 should become short-circuited. With diode 60 connected across the emitter-base electrodes of control transistor 30 and poled in the direction as shown in FIG. 1, the potential appearing across the base-emitter junction in a reverse polarity relationship will not exceed the potential drop across diode 60.

A circuit through which base-emitter current may flow through type NPN control transistor 40 may be traced from the positive polarity terminal of direct current potential source 10, through lead 26, resistor 48, the base-emitter electrodes of type NPN transistor 40, emitter resistor 28 and point of reference or ground potential 5 to the negative polarity terminal of direct current potential source 10. As the collector-emitter electrodes of type NPN transistor 40 are poled for forward conduction therethrough, control transistor 40 is normally conducting through the collector-emitter electrodes.

A circuit through which base-emitter current may flow through control transistor 30 may be traced from the positive polarity terminal of direct current potential source 10, through lead 26, resistor 17, the base-emitter electrodes of type NPN transistor 30, emitter resistor 28 and point of reference or ground potential 5 to the negative polarity terminal of direct current potential source 10. As the collector-emitter electrodes of this type NPN transistor are poled for forward conduction therethrough, control transistor 30 is normally conducting through the collector-emitter electrodes in class A operation.

With control transistor 30 conducting through the collector-emitter electrodes, a circuit is established for emitter-base current flow through type PNP output transistor 20 which may be traced from the positive polarity terminal of battery 10, through lead 26, resistor 24, the emitter-base electrodes of type PNP transistor 20, resistor 34, the collector-emitter electrodes of control transistor 30, emitter resistor 28 and point of reference or ground potential 5 to the negative polarity terminal of direct current potential source 10. As the emitter-collector electrodes of type PNP output transistor 20 are poled for forward conduction therethrough, this device is normally conducting through the emitter-collector electrodes.

An input signal applied across input terminals 11 and 12 of a polarity at terminal 11 which is positive with respect to terminal 12 is of the correct polarity relationship to increase base-emitter and, consequently, collector-emitter current flow through control transistor 40, the greater the magnitude of the input signal the greater the increase of collector-emitter current flow through transistor 40. An increase of collector-emitter current flow through transistor 40 with an increasing magnitude of input signal applied across input terminals 11 and 12 produces an increased current flow through emitter resistor 28 and, consequently, a tendency to increase the potential drop across emitter resistor 28. As the potential drop across emitter resistor 28 begins to increase in magnitude, the potential at junction 46 becomes more positive with respect to ground 5, a condition which reduces the potential drop across the base-emitter junction of transistor 30. Consequently, the degree of conduction through the base-emitter electrodes and, in turn, the collector-emitter electrodes of control transistor 30 will decrease by an amount which will maintain the potential drop across emitter resistor 28 substantially equal to the potential drop across resistor 18 plus the diode drop across the base-emitter electrodes of transistor 30. Consequently, the emitter-base drive current through control transistor 20 is decreased by this amount, a condition which also decreases the emitter-collector current flow therethrough to reduce the magnitude of the output signal appearing across collector resistor 25. As the input signal continues to increase in magnitude, collector-emitter conduction through control transistor 40 also increase which tends to produce an increased potential drop across emitter resistor 28, a condition which further reduces collector-emitter current flow through transistor 30 and, consequently, emitter base and emitter-collector current flow through output transistor 20, thereby further reducing the output signal appearing across collector resistor 25.

With a decrease in the magnitude of the input signal, base-emitter and, consequently, collector-emitter current flow through transistor 40 decreases. The result of the corresponding decrease of current flow through and potential drop across emitter resistor 28 is an increase of collector-emitter current flow through control transistor 30 and emitter-base current flow through output transitor 20. Increased emitter-base current flow through output transistor 20 produces an increase of emitter-collector current flow therethrough to increase the magnitude of the output signal.

In this manner, the circuit of this invention produces an output signal which varies inversely with the magnitude of the input signal.

In a practical application, the circuit of this invention was employed as a speed determining and sensing circuit in combination with a three phase, alternating current induction motor speed control system, set forth in FIG. 2 wherein like elements of FIG. 1 have been given like characters of reference, of the type which produces an electrical trigger signal at the same electrical angle of each potential half cycle of each phase of the alternating current supply potential and a circuit arrangement, FIG. 3, for establishing an energizing circuit for each phase winding of an induction motor across a phase of the alternating current supply potential source in response to the electrical trigger signals produced by the speed control circuit of FIG. 2.

One phase of the supply potential source may be connected to the alternating current input circuit terminals of a diode bridge type rectifier 62 for producing a source of direct current reference potential, in synchronism with the reference phase, which is applied across the anode-cathode electrodes of silicon controlled rectifier 63 and the base electrodes of unijunction transistors 64 and 65 to forward pole the current carrying electrodes of these devices. A motor 66 which is to be controlled by this circuit drives a rotating permanent magnet armature 68 of a magnetic pickup unit. The lobes on the rotating permanent magnet armature 68 pass in close proximity to the pole tips of field iron 70 to produce a pulsating flux in field iron 70. This pulsating flux induces a potential and pickup coil 71 which is applied across the end terminals of a conventional potentiometer 72. The alternating current appearing across potentiometer 72 is taken therefrom through movable contact 73 and applied across the alternating current input terminals of a bridge rectifier 75. The direct current output circuit terminals of rectifier 75 are connected across input circuit terminals 11 and 12 of the circuit of this invention. For any particular setting of movable contact 73 of potentiometer 72, output transistor 20 conducts through the emitter collector electrodes thereof to a degree as determined by the magnitude of the input signal appearing across input circuit terminals 11 and 12. A capacitor 76 is connected in series with collector resistor 25 in this circuit and charges at a rate determined by the degree of conduction through the current carrying electrodes of output transistor 20. When capacitor 76 has become charged to the peak point potential of unijunction transistor 65, this device switches to its low resistance state to provide a discharge circuit for capacitor 76. The current flow resulting from the discharge of capacitor 76 produces a potential signal across resistor 78 which is of a positive polarity at the end connected to the base of unijunction transistor 65. This potential signal is the first trigger signal and is produced at the electrical angle of each potential half cycle of the reference phase of the alternating current supply potential as determined by the setting of movable contact 73 of potentiometer 72. The trigger signal appearing across resistor 78 may be amplified by transistor 80 which is triggered conductive upon the application of this signal across the base-emitter electrodes thereof. The resulting current flow through primary winding 81 of a pulse transformer induces a potential in each of secondary windings 82 and 83. The amplified trigger signal induced in secondary winding 82 may be applied across external circuitry through terminals 84(2) and 85(2). The amplified trigger signal induced in secondary winding 83 is applied across the base-emitter electrodes of transistor 90, which is the control transistor of a monostable multivibrator circuit, to switch this device conductive. As transistor 90 is switched conductive, the other transistor 91 of the multivibrator circuit is switched nonconductive to place the monostable multivibrator in the alternate state and a trigger signal appears across transistor 91 which may be amplified by transistor 92. At the conclusion of a period of time which is determined by the timing circuit network, the multivibrator spontaneously returns to its original state of operation with transistor 91 conducting and transistor 90 not conducting. With transistor 91 conducting, substantially ground potential is placed across the base-emitter electrodes of transistor 92 which biases this device not conductive. The resulting collapsing magnetic field in primary winding 86 of a pulse transformer induces an amplified trigger signal in secondary windings 87 and 88. The amplified trigger signal induced in secondary winding may be applied to external circuitry through terminals 93(2) and 94(2). The amplified trigger signal in secondary winding 88 is applied across base-emitter electrodes of the control transistor of a second monostable multivibrator and amplifier circuit 95 which, since it is identical to the monostable multivibrator and amplifier circuit just described, has been shown in block form for the purpose of reducing drawing complexity. Upon the collapse of the magnetic field of primary winding 96 of a pulse transformer, as the monostable multivibrator of circuit 95 returns to its stable state, an amplified trigger signal is induced in secondary winding 97 which may be applied to external circuitry through terminals 98(2) and 99(2). For three phase applications, the delay designed into the timing circuitry of each of the two monostable multivibrator circuits is of sufficient duration to separate the respective trigger signals by 120 electrical degrees.

A circuit arrangement for establishing an energizing circuit for each phase winding of an alternating current induction motor across a three phase alternating current supply potential source in response to the electrical trigger signals occurring during each potential half cycle of each phase of the alternating current supply potential source is set forth in FIG. 3. The output terminals 84(2), 85(2), 93(2), 94(2), 98(2) and 99(2) of FIG. 2 are electrically connected to input terminals 84(3), 85(3), 93(3), 98(3) and 99(3), respectively, of FIG. 3.

A trigger signal appearing across output terminals 84(2) and 85(2) of FIG. 2, electrically connected to input terminals 84(3) and 85(3), respectively, of FIG. 3, will trigger silicon controlled rectifier 100 conductive to complete an energizing circuit for induction motor 66 phase windings A and B across phases 1 and 2 of the three phase supply potential source, a trigger signal appearing across output terminals 94(2) and 93(2) of FIG. 2, electrically connected to input terminals 94(3) and 93(3), respectively, of FIG. 3, will trigger silicon controlled rectifier 101 conductive to complete an energizing circuit for induction motor 66 phase windings B and C across phases 2 and 3 of the alternating current supply potential source and a trigger signal appearing across output terminals 98(2) and 99(2), electrically connected to input terminals 98(3) and 99(3) of FIG. 3, will trigger silicon controlled rectifier 102 conductive to complete an energizing circuit for induction motor 66 phase windings C and A across phases 3 and 1 of the alternating current supply potential source.

A similar speed control system is disclosed and described in detail, including a detailed vector analysis of the potential relationships across the several phase windings over each potential cycle of each phase of the alternating current supply potential, in U.S. Pa. No. 3,387,196, Graham et al., which issued June 4, 1968 and is assigned to the same assignee as that of the present invention.

Should the speed of motor 66 tend to increase, the magnitude of the input signal potential appearing across input terminals 11 and 12 would increase in magnitude, a condition which produces increased conduction through the collector-emitter electrodes of transistor 40. The resulting increased potential drop across emitter resistor 28, of course, results in a decrease of collector-emitter current flow through control transistor 30 in a manner previously described. With a decrease of collector-emitter current flow through control transistor 30, there is a corresponding decrease in emitter-base drive current flow through output transistor 20, consequently, emitter-collector current flow through output transistor 20 is reduced. With a reduced emitter-collector current flow through output transistor 20, the time required for capacitor 76 to become charged to the peak point potential of unijunction transistor 65 is of a longer duration, consequently, the first and subsequent trigger signals are produced later during each potential half cycle of the alternating current potential, a condition which tends to reduce the speed of motor 66.

In the event the speed of motor 66 should decrease, the magnitude of the input signal potential applied across input terminals 11 and 12 would also decrease, a condition which would reduce the magnitude of collector-emitter current flow through control transistor 40. The resulting decrease of potential drop across emitter resistor 28 would result in an increased current flow through the collector-emitter electrodes of control transistor 30 in a manner previously described. With an increased collector-emitter current flow through control transistor 30, there is corresponding increase of emitter-base drive current flow through output transistor 20 which results in an increase of emitter-collector current flow through this device. With an increased emitter-collector current flow through output transistor 20, the time required for capacitor 76 to become charged to the peak point potential of unijunction 65 is reduced, consequently, the first and subsequent trigger signals are produced earlier during each potential half cycle of the alternating current supply potential, a condition which tends to increase the speed of motor 66.

From this description, it is apparent that the novel circuit of this invention may be employed as a speed selecting and sensing circuit in conjunction with an overall three phase alternating current motor speed control system.

While specific electrical components and polarities have been set forth in this specification, it is to be specifically understood that alternate components and compatible electrical polarities may be employed without departing from the spirit of the invention.

A preferred embodiment of the present invention has been disclosed and described in this specification, however, various modifications and substitutions may be made by those skilled in the art without departing from the spirit of the invention.

What we claim is:

1. A circuit for producing an output signal which varies inversely with the magnitude of an input signal comprising in combination with a source of direct current potential having positive and negative polarity terminals, input circuit means across which an input signal may be applied, output circuit means across which external utilization circuitry may be connected, an output transistor having a base electrode and two current carrying electrodes connected across said source of direct current potential and poled for forward conduction therethrough for producing an output signal across said output circuit means of a magnitude which is proportional to the degree of conduction through said current carrying electrodes, a control transistor having a base electrode and two current carrying electrodes, means for connecting said current carrying electrodes of said control transistor across said source of direct current potential and poled for forward conduction therethrough, base bias circuit means interconnected with said source of direct current potential and said base electrode of said control transistor for producing base drive current through said control transistor whereby said control transistor is normally conducting, means for connecting said base electrode of said output transistor to the polarity terminal of said source of direct current potential which will produce base drive current therefor through said current carrying electrodes of said control transistor and means responsive to an input signal applied across said input circuit means for varying the degree of conduction through said current carrying electrodes of said control transistor inversely with the magnitude of said input signal.

2. A circuit for producing an output signal which varies inversely with the magnitude of an input signal comprising in combination with a source of direct current potential having positive and negative polarity terminals, an output transistor having base, emitter and collector electrodes for producing an output signal, first and second resistors, means for connecting said first resistor, said emitter-collector electrodes of said output transistor and said second resistor in series across said positive and negative polarity terminals, respectively, of said source of direct current potential, a first control transistor having base, collector and emitter electrodes, third, fourth and fifth resistors, means for connecting said third resistor, said fourth resistor, said collector-emitter electrodes of said first control transistor and said fifth resistor in series across said positive and negative polarity terminals, respectively, of said source of direct current potential, sixth and seventh resistors, means for connecting said sixth and seventh resistors in series across said positive and negative polarity terminals of said source of direct current potential, means for connecting said base electrode of said first control transistor to the junction between said sixth and seventh resistors, means for connecting said base electrode of said output transistor to the junction between said third and fourth resistors, a second control transistor having base, collector and emitter electrodes, means for connecting said collector-emitter electrodes of said second control transistor across said positive polarity terminal of said source of direct current potential and the junction between said emitter electrode of said first control transistor and said fifth resistor, input circuit means across which the input signal may be applied, means for connecting said input circuit means to said base-electrode and said emitter electrode of said second control transistor and output circuit means connected across said second resistor.

PO-1050
(5/69)

UNITED STATES PATENT OFFICE
CERTIFICATE OF CORRECTION

Patent No. 3,585,515 Dated June 15, 1971

Inventor(s) Joseph A. Riess and Conrad P. Vespie

It is certified that error appears in the above-identified patent and that said Letters Patent are hereby corrected as shown below:

Column 1, line 9, after "substantially" delete "for" and insert -- linearly --. Column 4, line 29, "increase" should read -- increases --. Column 5, line 54, after "winding" insert -- 87 --. Column 6, line 4, after "93(3)," insert -- 94(3), --.

Signed and sealed this 7th day of December 1971.

(SEAL)
Attest:

EDWARD M.FLETCHER,JR.
Attesting Officer

ROBERT GOTTSCHALK
Acting Commissioner of Patents